J. J. KNECHT.
JACQUARD FOR EMBROIDERING MACHINES.
APPLICATION FILED DEC. 16, 1909.

979,964.

Patented Dec. 27, 1910.

Witnesses
E. Schallinger
J. Rabinowitz

Inventor
Johann Jacob Knecht
by B. Singer
Atty

J. J. KNECHT.
JACQUARD FOR EMBROIDERING MACHINES.
APPLICATION FILED DEC. 16, 1909.

979,964.

Patented Dec. 27, 1910.
7 SHEETS—SHEET 2.

Witnesses
E. Schallinger
J. Rabinowitz

Inventor
Johann Jacob Knecht
By B. Singer
Atty

J. J. KNECHT.
JACQUARD FOR EMBROIDERING MACHINES.
APPLICATION FILED DEC. 16, 1909.

979,964.

Patented Dec. 27, 1910.

Witnesses
E. Schallinger
J. Rabinowitz

Inventor
Johann Jacob Knecht
By B. Singer
Atty

J. J. KNECHT.
JACQUARD FOR EMBROIDERING MACHINES.
APPLICATION FILED DEC. 16, 1909.

979,964.

Patented Dec. 27, 1910.
7 SHEETS—SHEET 5.

Witnesses
E. Schallinger
J. Rabinowitz

Inventor
Johann Jacob Knecht
by B. Singer
Atty

J. J. KNECHT.
JACQUARD FOR EMBROIDERING MACHINES.
APPLICATION FILED DEC. 16, 1909.

979,964.

Patented Dec. 27, 1910.
7 SHEETS—SHEET 6

Witnesses
E. Schallinger
J. Rabinowitz

Inventor
Johann Jacob Knecht
by B. Singer
Atty.

J. J. KNECHT.
JACQUARD FOR EMBROIDERING MACHINES.
APPLICATION FILED DEC. 16, 1909.

979,964.

Patented Dec. 27, 1910.
7 SHEETS—SHEET 7.

UNITED STATES PATENT OFFICE.

JOHANN JACOB KNECHT, OF CHEMNITZ, GERMANY.

JACQUARD FOR EMBROIDERING-MACHINES.

979,964.  Specification of Letters Patent.  Patented Dec. 27, 1910.

Application filed December 16, 1909. Serial No. 533,450.

*To all whom it may concern:*

Be it known that I, JOHANN JACOB KNECHT, a citizen of the Confederation of Switzerland, and residing at Chemnitz, Kingdom of Saxony, Germany, have invented certain new and useful Improvements in Jacquards for Embroidering-Machines, of which the following is a specification.

My invention relates to embroidery machines, and a primary object is to provide improved means by which embroidery frames in such machines are moved automatically according to the movements controlled by a jacquard card.

An important feature of my invention as compared with devices of this type known heretofore is that the needles which can be influenced by the jacquard card are so connected with the hooks that they admit of the hooks moving vertically to the direction of motion of the needles without influencing the movement of the latter. In this manner a simpler arrangement and a more precise mode of operation are obtained.

Several illustrative embodiments of my invention are represented by way of example in the accompanying drawings, wherein.

Referring to the drawings and firstly to Figs. 1 to 4$^a$, 1 designates the main shaft from which all the other parts of the device are driven. On said shaft is secured lever 2 carrying a gudgeon or pin 3. On shaft 4 is secured a wheel 5 having radial slots 6. Lever 2 and slotted wheel 5 are so proportioned that at each complete revolution of shaft 1 pin 3 reciprocates in a slot 6 and rotates wheel 5 one sixth of a revolution. On shaft 4 is secured also spur wheel 7.

Shafts 8, 9, 10 and 11, which are square except at the journals, are journaled in the side walls 16, 17 of the frame of the machine. Spur wheels 12, 13, 14 and 15 are secured on these shafts which are so arranged that wheel 7 secured on shaft 4 meshes with wheel 13, wheel 12 with wheel 13, the latter with wheel 14 and this with wheel 15.

To the wall 16 are rigidly secured the two hollow shafts 18, 19 in which the worms 20, 21 are movable axially but not revolubly. Worm 20 engages in the internally threaded sleeve or nut 22 which is revoluble but not displaceable axially in wall 17, and worm 21 engages in the internally threaded sleeve or nut 23 which is likewise revoluble but not displaceable axially in wall 17. Eight pinions 24 on shaft 8, eight pinions 25 on shaft 9, eight pinions 26 on shaft 10 and eight pinions 27 on shaft 11 are axially displaceable along but not revoluble on their respective shafts. The pinions 24 and 25 can individually mesh with the gear wheels 28 formed as planet-wheel carriers and rotatable on hollow shaft 18, and the pinions 26, 27 can individually mesh with the gear wheels 29 formed as planet-wheel carriers and rotatable on hollow shaft 19. To this end, each of the wheels 24, 25, 26, 27 run into a hub 30, 31, 32, 33, respectively, in whose grooves pins 34, 35, 36, 37, respectively, of arms or levers 38, 39, 40, 41, respectively engage which are respectively secured to or integral with the vertical shafts 42, 43, 44, 45. These vertical shafts are journaled at 46, 47; 48, 49; 50, 51; and 52, 53, respectively.

Figure 4:
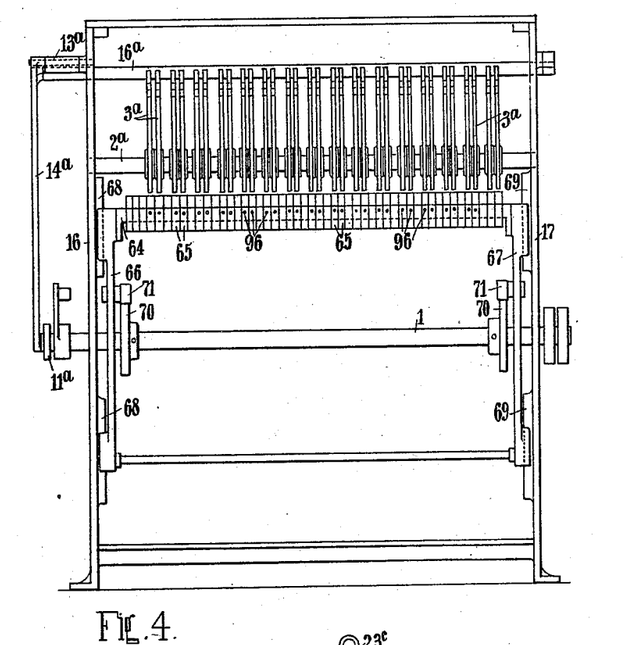
Figure 4A:
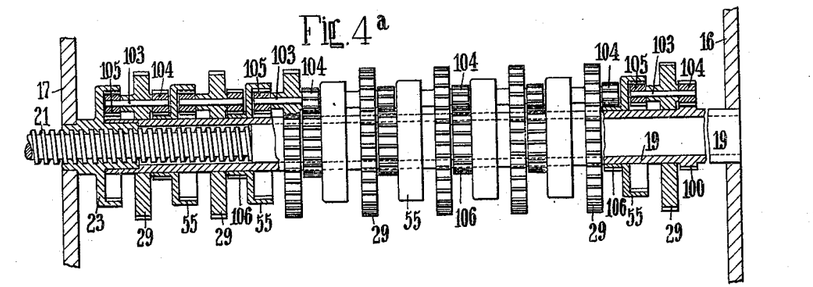

The arrangement and mode of operation of the planet-wheel carriers 28, 29 will be readily understood from Fig. 4$^a$ which clearly shows the planet gear arranged around hollow shaft 19. This fixed shaft is integral with the ring of teeth 100 and carries seven wheels 55 which are revoluble but not movable axially. These wheels are similar in shape to wheel 23 but are not internally screw-threaded in their hubs. In each planet-wheel carrier 29 is journaled parallel to worm 21 a short axle 103, to the ends of which are secured pinions 104 and 105. That pinion 104 journaled on the first wheel 29 counting from the right hand of Fig. 4ᵃ meshes with the stationary ring of teeth 100. Pinion 105 on the same axle meshes with inwardly directed teeth of the adjacent wheel 55. Each of the wheels 55 is provided with a ring of teeth 106, like ring of teeth 100, meshing with the pinion of the right-hand adjacent planet-wheel carrier 29. The number of inwardly directed teeth of each of these wheels 55, and also wheel 23, is twice that of those rings of teeth 106 integral with them which are of the same diameter and have the same number of teeth as the stationary ring of teeth 100. All the wheels 29 likewise have equal numbers of teeth. The planet-wheel gearing arranged around hollow shaft 18 is exactly similar to that around shaft 19.

The gear wheels 28, 29 carrying planet-wheels are so dimensioned and by virtue of their planet-wheels act in such manner on the wheels 54, 55 that when each one of the same rotates alone and in order, the worms 20, 21 have imparted to them movements which are in geometric ratio, i. e. as $1 : 2 : 4 : 8 : 16 : 32 : 64 : 128$. For example, according as one or more of the wheels 24 become meshed with the wheels 28, the individual axial movements of worm 20 caused by the rotation of these wheels are added to or subtracted from one another. According as the wheels 24, 25 are caused to mesh with or be disconnected from the wheels 28, and according as the wheels 26, 27 are caused to mesh with or be disconnected from the wheels 29 every optional axial movement within certain limits can be imparted to worms 20 and 21. The two slides 56, 57 which coact with the pin 58 of the embroidery frame 59 are secured to the worms 20, 21.

On shafts 8, 9 and 10, 11 are arranged a series of locking devices. The purpose of these is to lock the wheels 28, 29 at the moment when the wheels 24, 25 and 26, 27 are disengaged from the same. As clearly shown in Fig. 2, in the illustrative embodiment each locking device consists of a stirrup or shackle 60 mounted over the shafts 8, 9 or 10, 11, having a detent 61 and under the influence of two springs 62 which are arranged on the shafts and abut against pins 63. Near the bottom of Fig. 2 to the left the wheels 27 are shown meshing with wheels 29, and consequently the appertaining shackles 60 are positioned so that detents 61 do not engage with the wheels 29, whereas when the wheels 27 are moved axially away from wall 16, shackles 60 are pushed by springs 62 into engagement with the wheels 29 and prevent the same rotating.

Since the pairs of shafts 8, 9 and 10, 11 rotate in opposite directions it is necessary that, with respect to one of the wheels 28, 29 the two appertaining wheels 24, 25 or 26, 27 are never in mesh simultaneously, namely that as soon as one of the wheels 24, 25 meshes with one of the wheels 28, or one of the wheels 26, 27 with one of the wheels 29, the other of the wheels 24, 25 or 26, 27 and the detent of shackle 60 must be disconnected therefrom. If none of the wheels 24, 25 or 26, 27 mesh with the appertaining wheels 28 or 29, the wheel 28 or 29 in question becomes locked in the above described manner. For example, if one or more of wheels 24 mesh with wheels 28, shaft 20 will rotate counter-clockwise in the illustrative embodiment. Spindle 20 then moves to the right in the direction of the arrow in Fig. 3 and imparts its motion to slide 56. Consequently pin 58 is moved upwardly to the right in the slot in the other slide 57 and embroidery frame 59 is moved upwardly to the right. If instead of wheels 24 one or more wheels 25 mesh with wheels 28, spindle 20 and slide 56 are moved in the opposite direction, as explained above.

Figure 1:
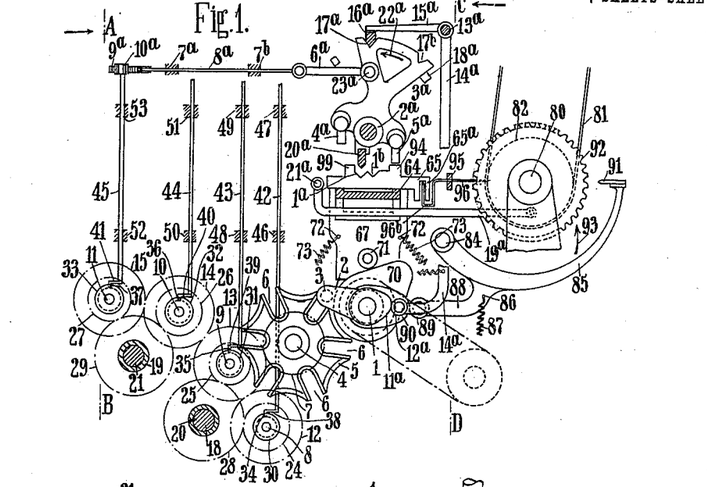
Figures 1, 2, 3 and 4 show one embodiment in side elevation, horizontal section, vertical section in the plane A—B in Fig. 1, and vertical section in the plane C—D in Fig. 1, respectively, and Fig. 4$^a$ is an elevation, partly in section, showing gearing which actuates the one screw-spindle of the embroidery frame.
Figure 2:
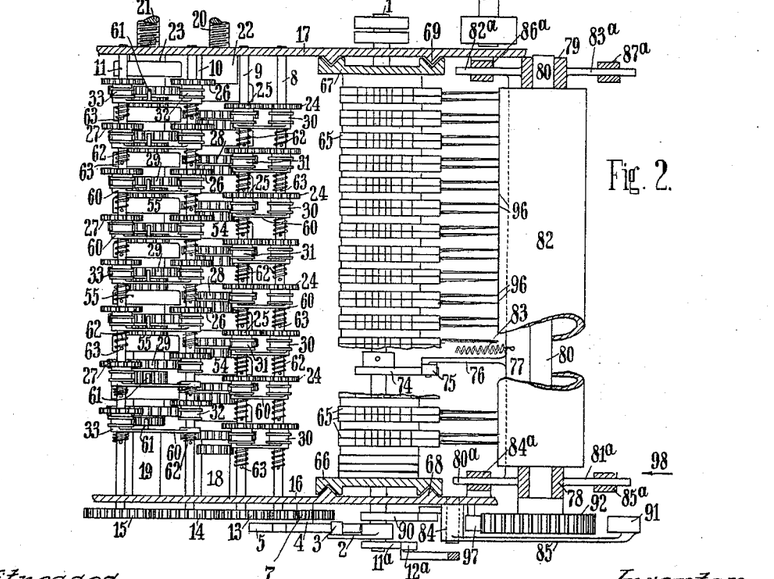
Figure 3:
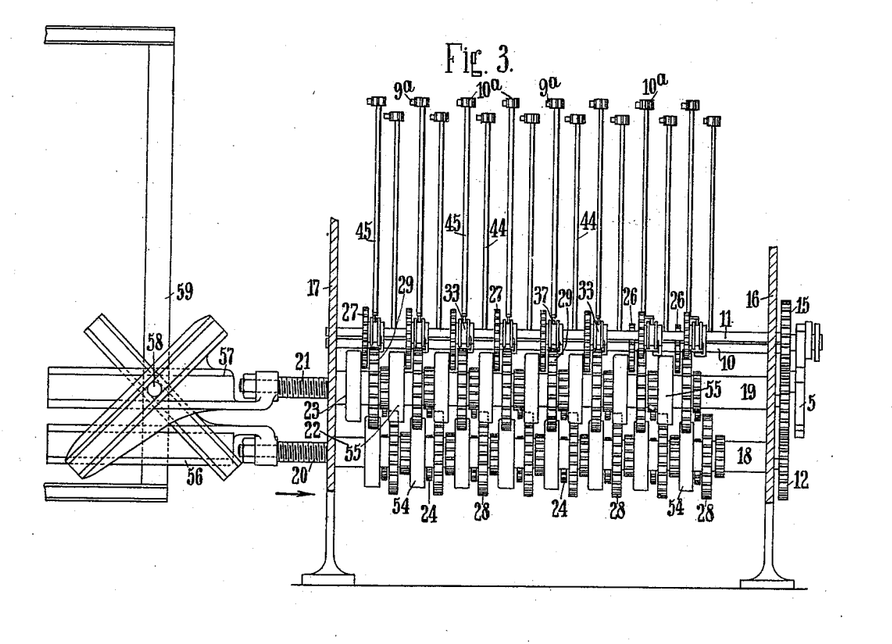

In Figs. 1 to 4, 64 designates the box for carrying hooks 65. This box is rigidly connected with the walls 66, 67 having grooves corresponding with the guides 68, 69 integral with the frame, so that the box can be moved vertically up and down these guides. On shaft 1 are secured at two places two cams 70 each coacting with a roller 71 revolubly mounted on the walls 66 and 67, respectively, of the box 64. Springs 73 connected also with the machine frame are attached at 72 to these walls. Another cam 74 which coacts with roller 75 of lever 76 is secured on shaft 1. This lever is connected by rib 77 with the two standards 78, 79 in which shaft 80 of cylinder 82 carrying the jacquard cards 81 is journaled. These standards each have two guide rods 80ᵃ, 81ᵃ and 82ᵃ, 83ᵃ, respectively, guided respectively at 84ᵃ, 85ᵃ and 86ᵃ, 87ᵃ. Rib 77 is connected with one end of a spring 83 whose other end is secured to the machine frame. In the frame is also secured bolt 84 on which lever 85 is mounted to rock. This lever is connected at 86 with a spring 87 attached to the frame and extends below into an arm 88 with whose roller 89 cam 90 secured on shaft 1 coacts. Arm 85 carries a detent 91 which, as soon as lever 85 is rotated around pivot 84 by cam 90 in the direction of arrow 93, snaps into ratchet wheel 92 and feeds the latter and shaft 80 one tooth, whereby a new row of holes arrives in front of the needles 96. On the wall 16 is also provided a detent 97 which when the cylinder moves back in the direction of arrow 98 prevents wheel 92 and the cylinder rotating further. In box 64 are mounted displaceably in support 95 the thirty-two hooks 65 connected in such manner with the displaceable needles 96 that when one part, e. g. needle 96, is moved horizontally, the other part, e. g. hook 65, is driven, whereas the hook can move vertically independently of the needle. To this end, needle 96 is formed U-shaped at 96$^b$ and clasps a downwardly pointing finger 65$^a$ of hook 65. Each hook has two lugs 94, 99 and two notches 1$^a$ and 1$^b$. In the frame is journaled the axle 2$^a$ on which thirty-two riders 3$^a$ are mounted to rock. On each rider are pivotally suspended two stamps or pushers 4$^a$, 5$^a$ which occupy such a position relatively to the needles that after the displacement of the needles in the one or other direction either lug 94 is under stamp 5$^a$, as shown in Fig. 1, or lug 99 is under stamp 4$^a$. To each rider is pivoted at 23$^a$ a rod 6$^a$ pivotally connected with rod 8$^a$ guided at 7$^a$, 7$^b$. These rods 8$^a$ have racks 9$^a$, each of which meshes with a wheel 10$^a$ on a vertical shaft 42, 43, 44 or 45. On shaft 1 is secured a cam 11$^a$ coacting with roller 12$^a$ of angle lever 14$^a$, 15$^a$, fulcrumed at 13$^a$. Arm 15$^a$ carries a detent strip 16$^a$ which in the position of the parts shown in Fig. 1 enters into the notches 17$^a$ of the riders and stops the same as soon as they have completed the rocking motion in the direction opposite to that indicated by arrow 22$^a$ limited by the stop 18$^a$. Each rider has a second notch 17$^b$ in which strip 16$^a$ is placed as soon as the riders have rocked in the opposite direction. The hub of each rider has a detent member 20$^a$ which enters into one of the notches 1$^a$, 1$^b$, when the rider rocks in the direction of arrow 22$^a$, and stops hook 65. In each standard 78, 79 is secured a rod 19$^a$ connected with the cross-bar 21$^a$. This cross-bar is opposite the hooks 65 and coacts with the same as soon as cylinder 82 moves in the direction opposite to arrow 98.

My apparatus as described above operates as follows:—When shaft 1 is rotated cam 90 coacts with lever 85 so that tooth 91 coacts with ratchet wheel 92 and feeds the same. Shaft 80 and cylinder 82 are rotated and the jacquard cards are consequently moved forward and a new row of holes arrives in front of the needles 96. At this moment the standards 78, 79 move under the influence of springs 83 in the direction of arrow 98 and at the end of this motion cylinder 82 is held in its correct position by detent 97. Those needles 96 which coincide with holes in the card enter through the same into the cylinder. Those needles, however, which have no holes opposite them are moved in the direction of arrow 98 together with the appertaining hooks 65 into such a position to the left that lugs 99 arrive under stamps 4$^a$. Now when the cams 70 coact with rollers 71 of the box 64 and raise the latter, those riders, under whose stamps 4$^a$ the lugs 99 are located, are rocked in a direction opposite to arrow 22$^a$ into the position shown in Fig. 1. This rocking motion is imparted by rods 6$^a$, 8$^a$ to the corresponding shafts 42, 43, 44, 45, whereby a definite axial displacement of worms 20, 21 and of the embroidery frame influenced by the latter is occasioned. Consequently, according in each case to the row of holes in the jacquard card in front of the needles, a definite displacement of the embroidery frame is brought about, so that the embroidery machine works automatically. As soon as cam 74 coacts again with roller 75 and returns the standards 78, 79 into their former position, rod 21$^a$ coacts with the displaced hooks and returns them into their original position shown in Fig. 1, whereupon the cycle of operations is repeated.

Figure 5:
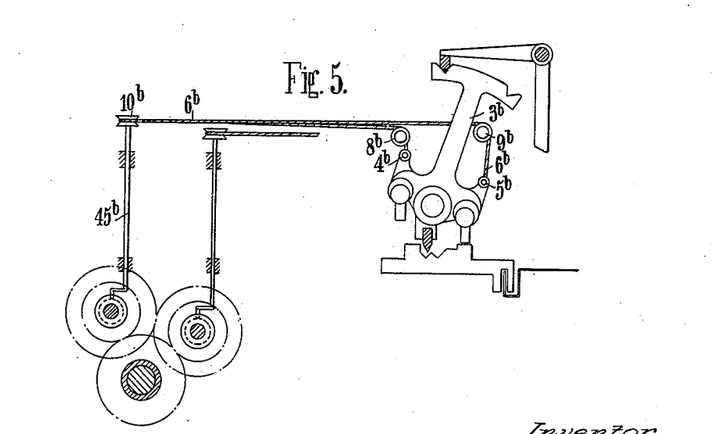
Fig. 5 shows a second illustrative embodiment in side elevation.

The illustrative embodiment according to Fig. 5 only differs from that described above in that the rocking motion of the riders is not imparted to the shafts 42 to 45 by racks and pinions, but by wire ropes 6$^b$ running over pulleys 10$^b$. To this end, each rider 3$^b$ is connected at 4$^b$ and 5$^b$ with a wire rope 6$^b$ running over the pulleys 8$^b$, 9$^b$ revoluble on the frame, and also over the pulley 10$^b$ secured on the appertaining shaft 45$^b$. It will be readily understood that as soon as rider 3$^b$ moves to the left or right this motion is imparted to the appertaining vertical shaft.

Figure 6:
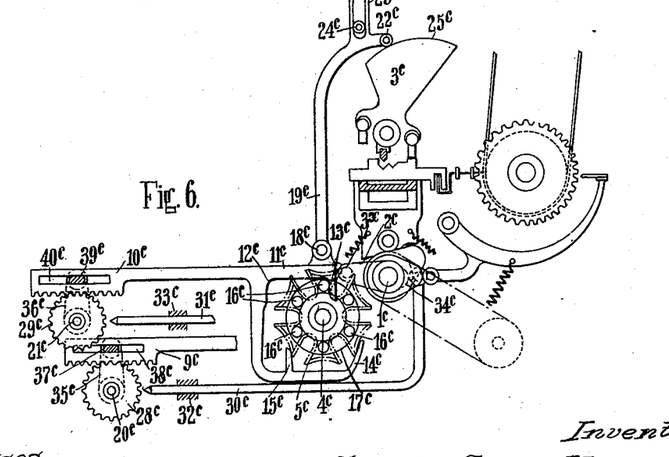
Fig. 6 is a like view of a third, and Fig. 7 a like view of a fourth illustrative embodiment.

In the illustrative embodiment according to Fig. 6 the planet-wheel carriers 28$^c$ 29$^c$ of the spindles 20$^c$, 21$^c$, respectively, are driven directly by racks 9$^c$, 10$^c$ respectively. Each rack runs out like rack 10$^c$ into a frame-like portion 11$^c$ having four shoulders or stops 12$^c$, 13$^c$, 14$^c$, 15$^c$. A guide lever 35$^c$, 36$^c$ is fulcrumed loosely on spindle 20$^c$, 21$^c$, respectively, beside each planet-wheel carrier. Each lever 35$^c$ has a lug 37$^c$ engaging in a slot 38$^c$ in rack 9$^c$ and each lever 36$^c$ has a lug 39$^c$ engaging in a slot 40$^c$ in rack 10$^c$. In this manner it is obtained that as soon as frame 9$^c$ or 10$^c$ is raised, the rack is not removed from the appertaining wheel 28$^c$ or 29$^c$, but rolls a short distance on the same. The slotted disk 5$^c$ is secured in the usual manner on shaft 4$^c$, and a pin 3$^x$ of lever 2$^c$ secured on main shaft 1$^c$ coacts with this slotted disk. On the shaft 4$^c$ are arranged disks 17$^c$ corresponding in number to the number of frames 11$^c$ and riders 3$^c$, to each of which disks are rigidly connected six pins 16$^c$. Frame 11$^c$ is pivotally connected at 18$^c$ with feeler lever 19$^c$ which is influenced by the rocking rider 3$^c$ and has a loop 23$^c$ guided by the fixed pin 24$^c$. Rider 3$^c$ is bounded above by a curve 25$^c$ with which it coacts with roller 22$^c$ on lever 19$^c$. For the wheels 28$^c$ and 29$^c$ are provided stop pins 30$^c$, 31$^c$, respectively, movable in guides 32$^c$, 33$^c$, respectively. These stops, which are for entering into a tooth gap when the wheels are stationary, are raised from the teeth gaps by cams 34$^c$ secured on shaft 1$^c$.

My mechanism according to Fig. 6 operates as follows:—The rotation of main shaft 1$^c$ is imparted by lever 2$^c$ and pin 3$^x$ on the latter to slotted disk 5$^c$ in the same manner as described above with reference to Figs. 1 to 4$^a$, so that disk 5$^c$ is rotated intermittently. Now when rider $3^c$ rocks to the right, lever $19^c$ together with frame $11^c$ and rack $10^c$ descend. Consequently, the uppermost of the pins $16^c$ coacts with shoulder $13^c$ and displaces rack $10^c$ to the right, the corresponding wheel $29^c$ being rotated clockwise. When rider $3^c$ afterward rocks in the opposite direction, lever $19^c$ and frame $11^c$ are raised. Shoulder $13^c$ consequently moves out of reach of pin $16^c$, whereas shoulder $15^c$ moves into reach of the same. When slotted disk $5^c$ now rotates the lowest pin $16^c$ will coact with stop $15^c$ and displace the frame with its rack in the opposite direction, wheel $29^c$ being now rotated counter-clockwise. This illustrative embodiment has the advantage that the planet-wheel carriers $28^c$ and $29^c$ are driven directly from the slotted disk, whereby the mechanism is materially simplified. Moreover, for each planet-wheel carrier only one needle, one hook and one rider are necessary, namely in the present instance only sixteen needles.

Figure 7:
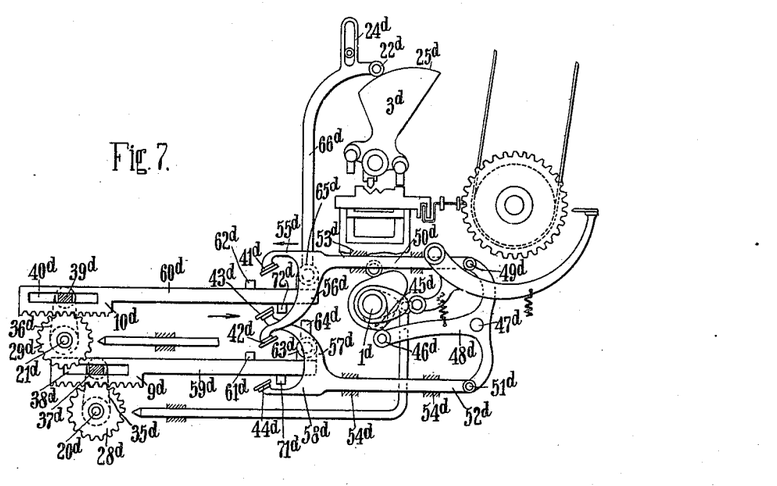

The illustrative embodiment according to Fig. 7 only differs from that last described in that the racks $9^d$ and $10^d$ coacting with the planet-wheel carriers $28^d$ and $29^d$, respectively, are not driven by a slotted disk but by blades $41^d$, $42^d$, $43^d$, $44^d$ which are reciprocated by the main shaft $1^d$. To this end, on the main shaft is secured cam $45^d$ coacting with roller $46^d$ of the three-armed lever $48^d$ fulcrumed ot $47^d$. This lever is pivotally connected at $49^d$ to rod $50^d$ and at $51^d$ to rod $52^d$. These rods $50^d$, $52^d$ are mounted movably at $53^d$, $54^d$. Rod $50^d$ is rigidly connected by the two arms $55^d$ and $56^d$ with the blades $41^d$ and $42^d$, respectively, and rod $52^d$ by the arms $57^d$ and $58^d$ with the blades $43^d$ and $44^d$, respectively. The racks $9^d$ and $10^d$ run out into rods $59^d$ and $60^d$, respectively. Rod $59^d$ has shoulders $61^d$, $71^d$ and rod $60^d$ has shoulders $62^d$, $72^d$. Rod 59 is pivotally connected at $63^d$ with the feeler lever $64^d$, and rod $60^d$ at $65^d$ with the feeler lever $66^d$. The riders $3^d$ are of the same shape as in the illustrated embodiment according to Fig. 6, i. e. they are limited by the curve $25^d$ coacting with roller $22^d$ on lever $66^d$ guided by its loop $24^d$. As the racks $9^d$ and $10^d$ are likewise guided by means of slots $36^d$ and $40^d$ at the lugs $37^d$ and $39^d$ of the levers $35^d$ and $36^d$, respectively, revolubly loosely on the shafts $20^d$ and $21^d$, respectively, when the rider rocks to and fro said racks will execute the same vertical movement as in the form according to Fig. 6. For example, in the position of rider $3^d$ shown in Fig. 7, when lever $66^d$ with rod $60^d$ is in its lowest position, shoulder $62^d$ will be moved away from blade $41^d$ but blade $43^d$ will be able to coact with shoulder $72^d$ when the main shaft $1^d$ rotates, cam $45^d$ coacts with roller $46^d$ of the three-armed lever $48^d$ and, owing to the same rocking, motion is imparted to rods $50^d$, $52^d$ and to the blades rigidly connected with the same. Now when rider $3^d$ rocks to the left, lever $66^d$ with rod $60^d$ is raised, and consequently shoulder $72^d$ moves out of reach of blade $43^d$ whereas shoulder $62^d$ is able to coact with blade $41^d$ as soon as this blade is moved by lever $48^d$.

Figure 8:
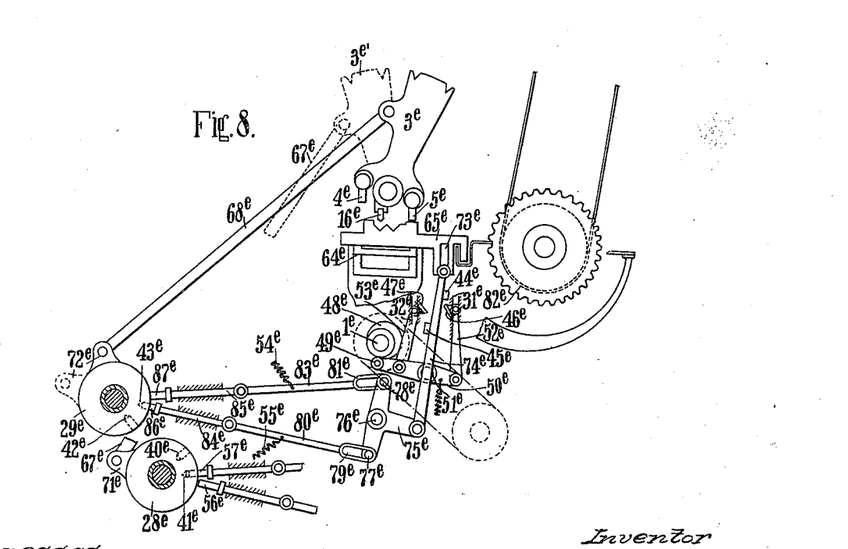
Figs. 8 and 9 are side elevation and top plan view, respectively, showing a fifth illustrative embodiment.
Figure 9:
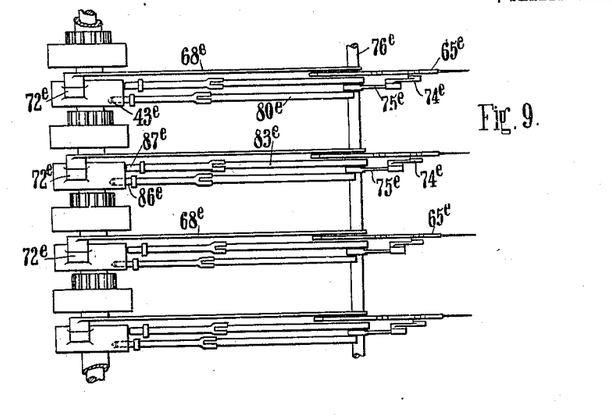

In the illustrative embodiment according to Figs. 8 and 9 the motion of main shaft $1^e$ is imparted by the riders $3^e$ to the wheels $28^e$ and $29^e$. To this end, these wheels have eyes $71^e$, $72^e$ pivotally connected by tie rods $67^e$, $68^e$, respectively, with the riders. In this form I make the hooks $65^e$ and the stamps $4^e$ and $5^e$ of specially strong and good material. Motion is derived by the box $64^e$ by means of cams from the main shaft. The motion is sufficiently strong to move the embroidery frame directly. Owing to the box $64^e$ with the hooks $65^e$ moving directly at right angles to the reciprocating motion of the cylinder $82^e$ and owing to the hooks $65^e$ being held by the lifters $16^e$ specially in their position, there is no fear of an impression being made in the card or paper, which may be emphasized as a special advantage of my invention. As in the form according to Figs. 1 to 4, after completing each rocking motion the riders $3^e$ may likewise be firmly held, which again means fixing the planet-wheel carriers $28^e$ and $29^e$. These planet-wheel carriers may, however, be fixed directly. To this end, each of the hooks $65^e$ is provided with a slot or link $73^e$ in which a rod $74^e$ pivotally connected to a three-armed lever $75^e$ is movable. This three-armed lever is pivoted on bolt $76^e$ and carries on its two arms pins $77^e$, $78^e$ movable in the slot $79^e$ in rod $80^e$ and in the slot $81^e$ of the rod $83^e$, respectively. Rod $80^e$ is pivotally connected with the guide rod $84^e$ and rod $83^e$ with the guide rod $85^e$. These guide rods $84^e$ and $85^e$ run out into the stop pins $86^e$ and $87^e$. The planet-wheel carriers $28^e$, $29^e$ each have two cavities or holes for the pins, e. g. wheel $29^e$ has two holes $42^e$ and $43^e$ for the stop pins $86^e$, $87^e$, but in different vertical planes, as Fig. 9 shows. When rider $3^e$ is in the position shown in Fig. 8 in which wheel $29^e$ has rotated to the right, the stop $86^e$ is in the hole $43^e$. But as soon as rider $3^e$ has rocked completely to the left, as shown in dotted lines, stop $86^e$ has come out of hole $43^e$ and stop $87^e$ has entered into hole $42^e$. To this end, rod $74^e$ has a right-hand shoulder $44^e$ and a left-hand shoulder $45^e$. Each rod $74^e$ is located between two blades $46^e$, $47^e$ which are mounted displaceably in guides $31^e$, $32^e$ and are moved oppositely by cam $48^e$ on shaft $1^e$. Namely, this cam coacts with roller $49^e$ of balancer $50^e$ which is pivoted at $51^e$ and to which the blade rods $52^e$, $53^e$ are pivotally connected. Thus before rider $3^e$ is rocked to the left blade $46^e$ will abut against stop 44$^e$ on rod 74$^e$, lift the latter and rotate counter-clockwise the three-armed lever 75$^e$. Consequently pin 78$^e$ slides idly along slot 81$^e$, whereas pin 77$^e$ withdraws rod 80$^e$ and rod 84$^e$ having stop 86$^e$ connected therewith from hole 43$^e$. Rider 3$^e$ can now rock to the left, wheel 29$^e$ being moved counter-clockwise, until stop 87$^e$ arrives over hole 42$^e$. At this moment stop 87$^e$ is pressed by spring 54$^e$ into hole 42$^e$. Shortly before rider 3$^e$ returns into its right-hand position, owing to cam 48$^e$ being rotated blade 47$^e$ coacts with stop 45$^e$, whereby rod 74$^e$ is lowered and three-armed lever 75$^e$ returned into the position shown in Fig. 8. Consequently stop 87$^e$ is withdrawn from hole 42$^e$. When rider 3$^e$ now arrives into the position shown in full lines in Fig. 8, wheel 29$^e$ is likewise returned into its position shown in full lines until hole 43$^e$ arrives under stop 86$^e$ and the latter is pressed by spring 55$^e$ into hole 43$^e$. Just as rider 3$^e$ is connected by rod 68$^e$ with planet-wheel carrier 29$^e$, rider 3$^{e\prime}$ is connected by rod 67$^e$ with carrier 28$^e$. This planet-wheel carrier 28$^e$ is stopped by the two pins 56$^e$ and 57$^e$ which are forced alternately into the holes 40$^e$, 41$^e$.

Figure 10:
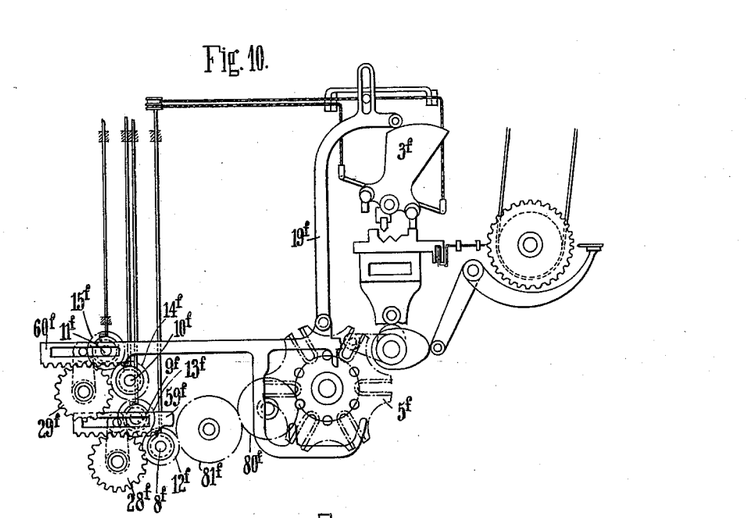
Figs. 10 and 11 are side elevation and detail view, respectively, showing a sixth illustrative embodiment.
Figure 11:
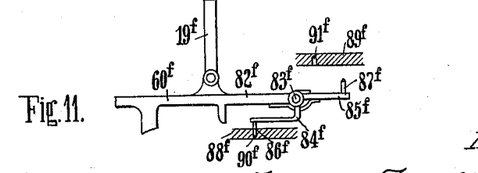

The illustrative embodiment according to Figs. 10 and 11 is a combination of the form according to Fig. 6 with that according to Fig. 5. Of the eight planet-wheel carriers 28$^f$, 29$^f$, the seven first of each are driven by racks 59$^f$, 60$^f$ from the slotted disk 5$^f$, i. e. in the manner as in the form according to Fig. 6. On the contrary, the eighth and last planet-wheel carriers are likewise driven from the slotted disk 5$^f$, but with the intermediary of spur-wheels 80$^f$, 81$^f$ and 12$^f$. Since wheel 12$^f$ on shaft 8$^f$ meshes with wheel 13$^f$ on shaft 9$^f$, and the latter wheel with wheel 14$^f$ on shaft 10$^f$, and wheel 14$^f$ with wheel 15$^f$ on shaft 11$^f$, motion is imparted to the eighth planet-wheel carriers 28$^f$ and 29$^f$ in exactly similar manner as in the form according to Figs. 1 to 4$^a$ or in that according to Fig. 5. As in the form described above with reference to Figs. 1 to 4$^a$, the motion of the eighth planet-wheel carrier is intermittent to the right or left or takes place continuously in one direction only.

Some relative advantages and disadvantages of these various forms will now be explained. Namely, the arrangement according to Fig. 6 has the advantage that each planet-wheel carrier requires only one needle, one hook and one rider, whereas it has the disadvantage that the displacement of the embroidery frame cannot be repeated whenever the slotted disk rotates a sixth part of a revolution in the same direction. In the arrangements according to Figs. 1 to 4 and 5, on the contrary, it is possible to repeat the displacement of the embroidery frame as frequently as desired, each sixth part of a revolution of the slotted disk being imparted to the embroidery frame if the wheels 24, 25, 26, 27 are in mesh with the planet-wheel carriers, but these forms have the disadvantage that two riders, two hooks and two needles are requisite for each of the planet-wheel carriers 28 and for each of the planet-wheel carriers 29 in order to rotate the planet-wheel carriers in the two directions. Now by combining the forms according to Figs. 1 to 4 and 5 with that according to Fig. 6, the seven first planet-wheel carriers being driven according to Fig. 6 and the eighth as in Figs. 1 to 4 and Fig. 5, the above mentioned advantages are united, only one hook, rider and needle being required for driving each of the first seven planet-wheel carriers, and two of the same for driving each of the two eighth planet-wheel carriers. In this manner the advantage is obtained that, although the arrangement is not much more complicated than that shown in Fig. 6, the embroidery frame can be displaced every sixth part of a revolution. Fig. 11 shows means by which the rack 59$^f$ or 60$^f$ can be stopped. These means are arranged and operate as follows:—Rack 60$^f$ has an extension 82$^f$. At 83$^f$ on the same is pivoted the double trip 84$^f$, 85$^f$ having pins 86$^f$, 87$^f$. 88$^f$, 89$^f$ are traverses mounted rigidly on the frame of the machine, into whose holes 90$^f$ and 91$^f$, respectively, pins 86$^f$, 87$^f$ respectively enter. Fig. 11 shows rack 60$^f$ moved to the right by lever 19$^f$ in the same manner as in the form according to Fig. 6. Now so long as no motion of rack 60$^f$ to the left is required, the same is held lowered, i. e. pin 86$^f$ remains in hole 90$^f$ of the traverse 88$^f$ and thereby prevents any other non-intentional movement of rack 60$^f$. If the rack 60$^f$ is to be moved to the left, when rider 3$^f$ rocks to the left this rack is lifted by means of rod 19$^f$. Consequently pin 86$^f$ is withdrawn from hole 90$^f$, whereupon said rack can move to the left. When this motion has ceased pin 87$^f$ enters into hole 91$^f$ and thus holds rack 60$^f$ in its left-hand position.

Figures 12, 13:
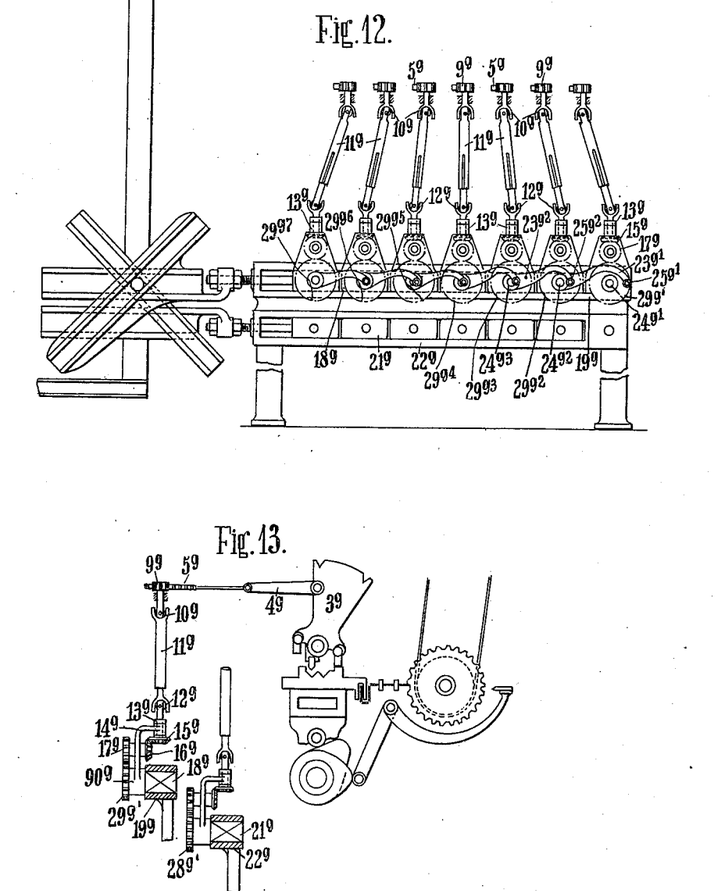
Figs. 12 and 13 are like views showing a seventh illustrative embodiment.

In the illustrative embodiment according to Figs. 12 and 13, the planet-wheel carriers are substituted by disk cranks connected in series. Motion is imparted to these cranks by riders 3$^g$ which impart their rocking motion by rods 4$^g$ and racks 5$^g$ to pinions 9$^g$. The rotatory motion of the latter is imparted by means of the ball-joint 10$^g$ to rod 11$^g$ which imparts it by means of ball-joint 12$^g$ to shaft 13$^g$ journaled in the holder 14$^g$ and carrying bevel wheel 15$^g$. The motion of this wheel is imparted to bevel wheel 16$^g$ whose shaft is rigidly connected with spur-wheel 17$^g$ journaled in holder 14$^g$. Wheel 17$^g$ imparts its motion to disk crank 29$^{g1}$. The bearing 90$^g$ for the axle of the latter is rigidly connected with holder $14^g$ and runs out into the guide $18^g$ mounted non-displaceably in link $19^g$. In the same manner as disk crank $29^{g1}$ is moved by a rider, disk crank $28^{g1}$ journaled in similar manner as the former is moved by another rider. The bearing for the axle of wheel $28^{g1}$ runs out into the guide $21^g$ non-displaceable in link $22^g$. As Fig. 12 shows, disk crank $29^{g1}$ is pivotally connected at $25^{g1}$ with one end of rod $23^{g1}$ whose other end surrounds the axle $24^{g2}$ of the disk crank $29^{g2}$. Disk crank $29^{g2}$ is pivotally connected at $25^{g2}$ with one end of rod $23^{g2}$ whose other end surrounds the axle $24^{g3}$ of disk crank $29^{g3}$, and so on. The arrangement is such that the distance between axles $24^{g2}$ and $25^{g2}$ is half that between the corresponding preceding axles $24^{g1}$ and $25^{g1}$. Each of the bearings for the axles of the disk cranks $29^{g2}$, $29^{g4}$ runs out like the bearing $90^g$ for the axle of the disk crank $29^{g1}$ into a guide. In contradistinction to the guide $18^g$ (Fig. 13) these guides are mounted displaceably in the link $19^g$. Each of the bearings for the axles of the disk cranks $28^{g2}$, $28^{g3}$, $28^{g4}$ ... runs out like the bearing for the axle of the disk crank $28^{g1}$ into a guide. In contradistinction to the guide $21^g$ (Fig. 13) these guides are mounted displaceably in the link $22^g$. When disk crank $29^{g1}$ has rotated half a revolution, owing to this rotatory motion the following disk crank is moved by means of rod $23^{g1}$, the guide block of disk crank $29^{g2}$ moving in its link $19^g$. If instead of disk crank $29^{g1}$ disk crank $29^{g2}$ be rotated, the rotation of the latter will move the next disk cranks an amount which is only half as great as the movement brought about by the rotation of disk crank $29^{g1}$, because the distance between the axles $24^{g2}$ and $25^{g2}$ is half that between the axles $24^{g1}$ and $25^{g1}$. If disk crank $29^{g7}$ only be rotated, the smallest movement of this crank $29^{g7}$ is brought about, because the rotation of this crank $29^{g7}$ causes a small rotation of the preceding crank $29^{g6}$ and this again a small rotation of disk crank $29^{g5}$, and so on, whereby a displacement of this crank $29^{g7}$ is occasioned during its rotation. In the present instance, it will be readily understood that the reciprocation of the embroidery frame is limited by the sum of the strokes of the crank pins, and consequently the advantage of the form described above with reference to Fig. 10 is not obtained.

I claim:—

1. In an embroidering machine, the combination, with a main shaft, a variable transmission gearing driven therefrom, and spindles driven by said gearing, of an embroidery frame actuated by said spindles, means for varying the ratio of transmission of said gearing, a displaceable and rotatable card cylinder driven intermittently from said main shaft, needles adapted to be moved rectilinearly by a card on said cylinder, and hooks operated intermittently by said shaft, coacting with said needles and adapted to move independently thereof rectilinearly in a direction at right angles to the direction of motion imparted by said needles and coact with said means.

2. In an embroidering machine, the combination, with a main shaft, a variable transmission gearing driven therefrom, and spindles driven by said gearing, of an embroidery frame actuated by said spindles, means comprising an axle, and riders mounted to rock on said axle, for varying the ratio of transmission of said gearing, a displaceable and rotatable card cylinder driven intermittently from said main shaft, needles adapted to be moved by a card on said cylinder, and hooks driven intermittently by said shaft, coacting with said needles and adapted to move independently thereof in a direction at right angles to the direction of motion imparted by said needles and coact with said riders.

3. In an embroidering machine, the combination, with a main shaft, a variable transmission gearing driven therefrom, and spindles driven by said gearing, of an embroidery frame actuated by said spindles, means comprising an axle, and riders mounted to rock on said axle, each rider having two pushers pivotally suspended therefrom, for varying the ratio of transmission of said gearing, a displaceable and rotatable card cylinder driven intermittently from said main shaft, needles adapted to be moved by a card on said cylinder, and hooks each having two lugs and driven intermittently by said shaft, coacting with said needles and adapted to move independently thereof in a direction at right angles to the direction of motion imparted by said needles and coact with said pushers and rock said riders.

4. In an embroidering machine, the combination, with a frame, a main shaft journaled therein, a variable transmission gearing driven by said shaft, and spindles driven by said gearing, of an embroidery frame actuated by said spindles, means comprising an axle, and riders mounted to rock on said axle, for varying the ratio of transmission of said gearing, a displaceable and rotatable card cylinder driven intermittently from said main shaft, needles adapted to be moved horizontally by a card on said cylinder, a box, carrying hooks, movable vertically in said former frame, means on said shaft for intermittently moving said box, said hooks coacting with said needles and able to move vertically independently thereof and coact with said means.

5. In an embroidering machine, the combination, with a main shaft, a variable transmission gearing driven therefrom, and spindles driven by said gearing, of an embroidery frame actuated by said spindles, means comprising an axle and riders rocking on said axle for varying the ratio of transmission of said gearing, each rider having two pushers pivotally suspended therefrom and two notches, a displaceable and rotatable card cylinder driven intermittently from said shaft, needles adapted to be driven horizontally by a card on said cylinder, notched hooks driven intermittently by said shaft, coacting with said needles and able to move vertically independently thereof and coact with said pushers, a detent on each rider for engaging in the notches in said hooks, and detent means controlled by said shaft for engaging in the notches in said riders.

6. In an embroidering machine, the combination, with a main shaft, axles, carrying axially movable pinions, driven therefrom, axially movable spindles, transmission gearing for driving said spindles, an embroidery frame movably connected with said spindles, a displaceable and rotatable card cylinder driven intermittently by said main shaft, and needles adapted to be moved horizontally by a card on said cylinder, of hooks adapted to be driven horizontally by, and to move vertically independently of, said needles, and rocking riders actuated by said hooks when the same move vertically operatively connected with said pinions for bringing the same severally into engagement with said gearing.

In testimony whereof I affix my signature in the presence of two witnesses.

JOHANN JACOB KNECHT.

Witnesses:
ALFRED BRUNN,
ARNO ROEDER.